(12) United States Patent
Niimi

(10) Patent No.: US 8,948,952 B2
(45) Date of Patent: Feb. 3, 2015

(54) APPARATUS AND METHOD FOR CONTROLLING VEHICLE

(75) Inventor: Kuniaki Niimi, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 14/234,895

(22) PCT Filed: Sep. 13, 2011

(86) PCT No.: PCT/JP2011/070809
§ 371 (c)(1),
(2), (4) Date: Jan. 24, 2014

(87) PCT Pub. No.: WO2013/038492
PCT Pub. Date: Mar. 21, 2013

(65) Prior Publication Data
US 2014/0180519 A1    Jun. 26, 2014

(51) Int. Cl.
*B60W 20/00* (2006.01)
*B60K 6/445* (2007.10)
*B60W 10/06* (2006.01)
*B60W 10/26* (2006.01)
(Continued)

(52) U.S. Cl.
CPC ............ *B60W 20/00* (2013.01); *B60K 6/445* (2013.01); *B60W 10/06* (2013.01); *B60W 10/26* (2013.01); *B60W 10/30* (2013.01); *B60L 11/1801* (2013.01); *B60L 11/1875* (2013.01); *B60W 30/18054* (2013.01); *B60W 30/192* (2013.01); *B60W 20/10* (2013.01); *Y02T 10/6269* (2013.01); *B60W 2710/0688* (2013.01); *B60W 2710/246* (2013.01); *Y02T 10/7005* (2013.01); *Y02T 10/705* (2013.01); *B60W 2530/145* (2013.01); *B60W 2550/402* (2013.01); *Y10S 903/904* (2013.01); *Y02T 10/6239* (2013.01); *Y02T 10/70* (2013.01)
USPC ............................................. 701/22; 903/904

(58) Field of Classification Search
USPC ........................................................... 701/22
See application file for complete search history.

(56) References Cited

U.S. PATENT DOCUMENTS 5,815,824 A * 9/1998 Saga et al. ...................... 701/22
8,417,403 B2 * 4/2013 Iida et al. ........................ 701/22
(Continued)

FOREIGN PATENT DOCUMENTS

JP    2002-343401 A    11/2002
JP    2006-188983 A    7/2006
(Continued)

OTHER PUBLICATIONS

International Search Report of PCT/JP2011/070809, dated Nov. 15, 2011.

*Primary Examiner* — Thomas Tarcza
*Assistant Examiner* — Alex C Dunn
(74) *Attorney, Agent, or Firm* — Sughrue Mion, PLLC

(57) ABSTRACT

A vehicle incorporates an engine to which an engine-related component is attached, a battery charged with electric power supplied from an external power supply, and an electric motor as a driving source to which electric power is supplied from the battery. An ECU causes at least one of the engine-related component and the battery to be heated, using the electric power supplied from outside while the electric power is being supplied from outside, in accordance with a distance over which the vehicle can run by driving the electric motor alone and a distance to a destination.

11 Claims, 5 Drawing Sheets

(51) Int. Cl.
  *B60W 10/30*  (2006.01)
  *B60L 11/18*  (2006.01)
  *B60W 30/18*  (2012.01)
  *B60W 30/192* (2012.01)

(56) References Cited

U.S. PATENT DOCUMENTS

| | | | |
|---|---|---|---|
| 2003/0015358 A1* | 1/2003 | Abe et al. | 180/65.3 |
| 2006/0180362 A1* | 8/2006 | Yamaguchi et al. | 180/65.2 |
| 2007/0029121 A1* | 2/2007 | Saitou et al. | 180/65.2 |
| 2010/0094493 A1* | 4/2010 | Atsumi | 701/22 |
| 2010/0185349 A1* | 7/2010 | Harada et al. | 701/22 |
| 2010/0324765 A1* | 12/2010 | Iida et al. | 701/22 |

FOREIGN PATENT DOCUMENTS

| | | |
|---|---|---|
| JP | 2008-120333 A | 5/2008 |
| JP | 2008-195214 A | 8/2008 |
| JP | 2009-224256 A | 10/2009 |
| JP | 2010-23527 A | 2/2010 |
| JP | 2010-220407 A | 9/2010 |
| JP | 2010-228618 A | 10/2010 |
| JP | 2010-259308 A | 11/2010 |
| JP | 2010-280379 A | 12/2010 |

\* cited by examiner

APPARATUS AND METHOD FOR CONTROLLING VEHICLE

CROSS REFERENCE TO RELATED APPLICATIONS

This application is a National Stage of International Application No. PCT/JP2011/070809 filed Sep. 13, 2011, the contents of all of which are incorporated herein by reference in their entirety.

TECHNICAL FIELD

The present invention relates to an apparatus and a method for controlling a vehicle, and more particularly to a technique of warming up at least one of an engine-related component and a power storage device.

BACKGROUND ART

A hybrid vehicle having an electric motor for running in addition to an engine, or an electric vehicle provided with a range extender is known. In these vehicles, the technique of charging a power storage device such as a battery with electric power supplied from an external power supply has been put to practical use.

During charging with electric power supplied from the external power supply, the engine can also be warmed up using the electric power supplied from the external power supply, as described in Japanese Patent Laying-Open No. 2010-23527 (PTL 1), for example.

CITATION LIST

Patent Literature

PTL 1: Japanese Patent Laying-Open No. 2010-23527

SUMMARY OF INVENTION

Technical Problem

However, if, for example, a vehicle can run from a present location to a destination using an electric motor alone as a driving source, the engine need not be warmed up in advance before departure. In this case, warm-up of the engine before departure does not contribute to improving the energy efficiency of the vehicle.

An object of the present invention is to improve energy efficiency.

Solution to Problem

According to one embodiment, an apparatus for controlling a vehicle having an engine to which an engine-related component is attached, a power storage device adapted to be charged with electric power supplied from outside, and an electric motor as a driving source to which electric power is supplied from the power storage device, includes a control unit that causes at least one of the engine-related component and the power storage device to be heated, using the electric power supplied from outside while the electric power is being supplied from outside, in accordance with the distance over which the vehicle can run by driving the electric motor alone and the distance to the destination.

With this structure, the device to be warmed up is changed in accordance with the distance over which the vehicle can run by driving the electric motor alone and the distance to the destination. Therefore, as a result of comparing the distance over which the vehicle can run by driving the electric motor alone and the distance to the destination, if warm-up of the power storage device is considered to contribute to improving energy efficiency, the power storage device can be warmed up in advance. If warm-up of the engine-related component is considered to contribute to improving energy efficiency, the engine-related component can be warmed up in advance. Consequently, energy efficiency can be improved.

According to another embodiment, the control unit causes the engine-related component to be heated, using the electric power supplied from outside while the electric power is being supplied from outside, if the distance to the destination is longer than the distance over which the vehicle can run by driving the electric motor alone.

With this structure, the engine-related component can be warmed up in advance if it is predicted that the engine will be operated for running of the vehicle.

According to still another embodiment of the invention, the control unit causes the power storage device to be heated, using the electric power supplied from outside while the electric power is being supplied from outside, if the distance to the destination is shorter than the distance over which the vehicle can run by driving the electric motor alone.

With this structure, if it is predicted that the engine will not be operated for running of the vehicle, the power storage device, rather than the engine-related component, can be warmed up in advance.

According to still another embodiment of the invention, the control unit determines, with respect to the engine-related component and the power storage device, whether heating is to be performed or not in accordance with a running pattern to the destination, in addition to the distance over which the vehicle can run by driving the electric motor alone and the distance to the destination.

With this structure, it can be determined whether the engine-related component or the power storage device is to be warmed up or not, based on a result of analyzing the necessity of warm-up in further detail, from the running pattern of the vehicle.

According to yet another embodiment of the invention, the control unit determines, from the running pattern to the destination, whether or not warm-up of the engine is completed with heat generated from the engine before arrival at the destination, and if the warm-up of the engine is not completed before arrival at the destination, the control unit causes the engine-related component to be heated, using the electric power supplied from outside while the electric power is being supplied from outside.

With this structure, the engine-related component is heated in advance if the engine cannot be warmed up with the heat generated by the engine itself. Therefore, the engine can be advantageously operated during operation of the engine.

According to still another embodiment of the invention, the control unit determines, from the running pattern to the destination, whether or not warm-up of the power storage device is completed with heat generated from the power storage device before arrival at the destination, and if the warm-up of the power storage device is not completed before arrival at the destination, the control unit causes the power storage device to be heated, using the electric power supplied from outside while the electric power is being supplied from outside.

With this structure, the power storage device is heated in advance if the power storage device cannot be warmed up with the heat generated by the power storage device itself.

Therefore, the power storage device can have an advantageous temperature during operation of the vehicle.

In yet another embodiment of the invention, the control unit determines whether the power storage device is to be heated or not in accordance with electric power consumed for heating the power storage device and an amount of increase in regenerative electric power obtained by heating the power storage device, in addition to the distance over which the vehicle can run by driving the electric motor alone and the distance to the destination.

With this structure, it is determined whether the power storage device is to be warmed up or not, in consideration of whether it is advantageous to warm up the power storage device in advance.

In still another embodiment of the invention, the control unit causes the power storage device to be heated, using the electric power supplied from outside while the electric power is being supplied from outside, if the amount of increase in regenerative electric power is greater than the electric power consumed for heating.

With this structure, the power storage device is warmed up in advance if it is advantageous to warm up the power storage device in advance.

In yet another embodiment of the invention, a method for controlling a vehicle having an engine having an engine-related component attached thereto, a power storage device adapted to be charged with electric power supplied from outside, and an electric motor as a driving source to which electric power is supplied from the power storage device, including the steps of comparing a distance over which the vehicle can run by driving the electric motor alone and a distance to a destination; and heating at least one of the engine-related component and the power storage device, using the electric power supplied from outside while the electric power is being supplied from outside, in accordance with the distance over which the vehicle can run by driving the electric motor alone and the distance to the destination.

With this structure, the device to be warmed up is changed in accordance with the distance over which the vehicle can run by driving the electric motor alone and the distance to the destination. Therefore, as a result of comparing the distance over which the vehicle can run by driving the electric motor alone and the distance to the destination, if warm-up of the power storage device is considered to contribute to improving energy efficiency, the power storage device can be warmed up in advance. If warm-up of the engine-related component is considered to contribute to improving energy efficiency, the engine-related component can be warmed up in advance. Consequently, energy efficiency can be improved.

Advantageous Effects of Invention

The device to be warmed up is changed in accordance with the distance over which the vehicle can run by driving the electric motor alone and the distance to the destination. Therefore, as a result of comparing the distance over which the vehicle can run by driving the electric motor alone and the distance to the destination, if warm-up of the power storage device is considered to contribute to improving energy efficiency, the power storage device can be warmed up in advance. If warm-up of the engine-related component is considered to contribute to improving energy efficiency, the engine-related component can be warmed up in advance. Consequently, energy efficiency can be improved.

DESCRIPTION OF EMBODIMENTS

Embodiments of the present invention will be described hereinafter, with reference to the drawings. In the following description, the same components are denoted by the same symbols. The names and functions thereof are also the same. Accordingly, detailed description thereof will not be repeated.

Figure 1:
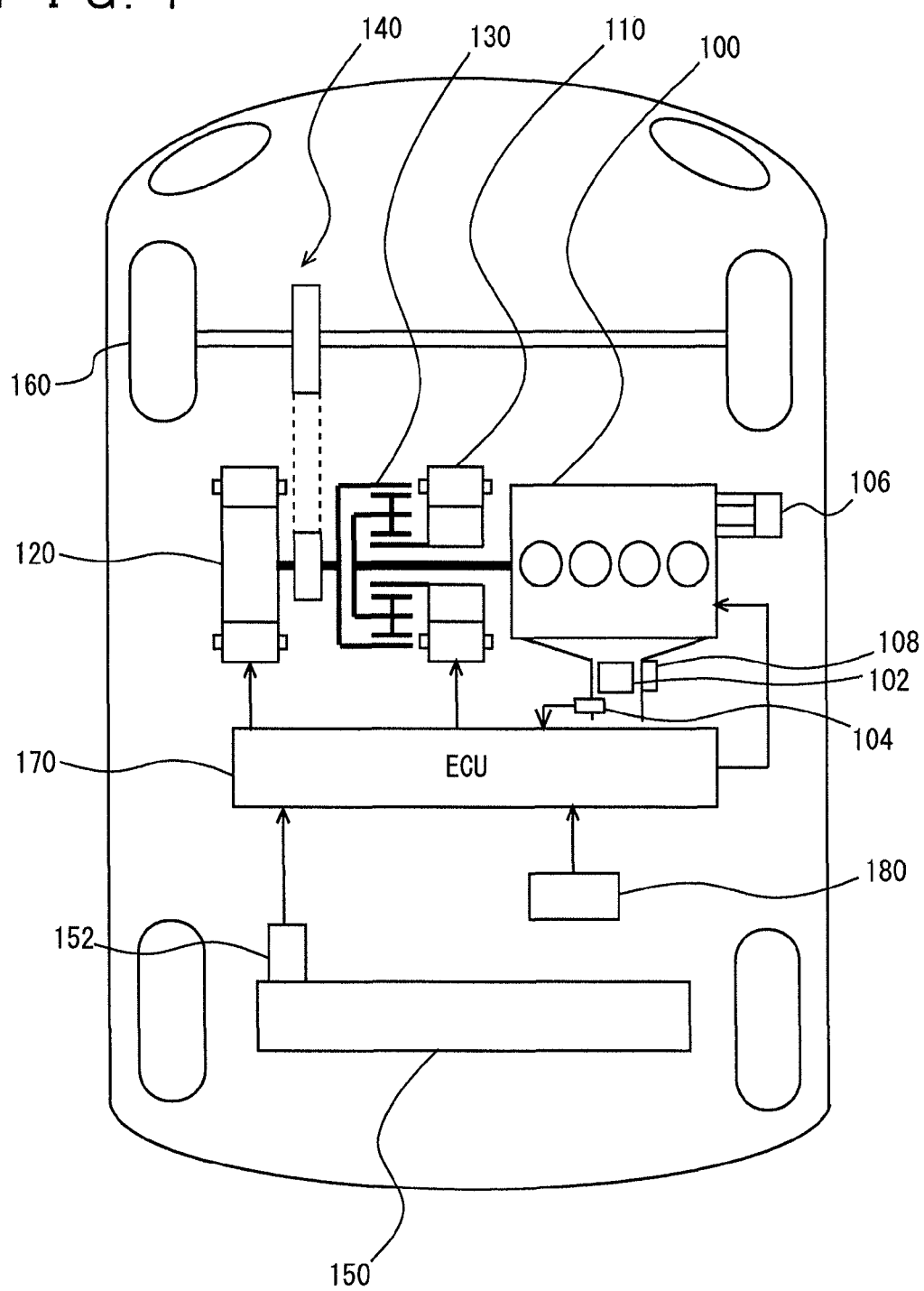
FIG. 1 is a schematic diagram generally showing a hybrid vehicle.

Referring to FIG. 1, a hybrid vehicle incorporates an engine 100, a first motor generator 110, a second motor generator 120, a power split device 130, a reduction gear 140, and a battery 150. The hybrid vehicle described in the present embodiment may also be an electric vehicle provided with a range extender.

Engine 100, first motor generator 110, second motor generator 120, and battery 150 are controlled by an ECU (Electronic Control Unit) 170. ECU 170 may be divided into a plurality of ECUs.

This vehicle runs with driving force from at least either one of engine 100 and second motor generator 120. That is, either one or both of engine 100 and second motor generator 120 are automatically selected as a driving source in accordance with an operating state.

When, for example, running power set in accordance with an accelerator pedal position and a vehicle speed is lower than an engine starting threshold value predetermined by a developer, the hybrid vehicle runs on second motor generator 120 alone as a driving source. In this case, engine 100 is stopped.

Conversely, when the running power is equal to or higher than the engine starting threshold value, engine 100 is driven. In this case, the hybrid vehicle runs on engine 100 alone, or both of engine 100 and second motor generator 120, as a driving source.

When a state of charge of battery 150 has become equal to or lower than a threshold value, engine 100 is started, in order to charge battery 150 until the state of charge is increased to a prescribed value.

Engine 100 may be used not as a driving source for running, but solely for power generation. That is, the hybrid vehicle may be a series hybrid vehicle.

Engine 100 is an internal combustion engine. A crankshaft serving as an output shaft rotates by combustion of an air-fuel mixture in a combustion chamber. Exhaust gas exhausted from engine 100 is purified by a catalyst 102 and then exhausted outside the vehicle. Catalyst 102 performs the purifying function by being increased in temperature to a prescribed activating temperature. Catalyst 102 is a three-way catalyst, for example.

An air-fuel ratio of engine 100 is detected by an air-fuel ratio sensor 104. An $O_2$ sensor (not shown) may be used instead of or in addition to air-fuel ratio sensor 104. Engine 100 is further provided with heaters 106, 108. Heater 106 heats a coolant of engine 100. Heater 108 heats catalyst 102. The coolant of engine 100, catalyst 102, air-fuel ratio sensor 104, $O_2$ sensor, and heaters 106, 108 will also be collectively referred to as the "engine-related components", hereinafter.

Engine 100, first motor generator 110, and second motor generator 120 are connected to one another via power split device 130. Mechanical power generated by engine 100 is split for two paths by power split device 130. One of them is a path for driving front wheels 160 via reduction gear 140. The other is a path for driving first motor generator 110 to generate power.

First motor generator 110 is a three-phase alternating-current rotating electric machine including a U-phase coil, a V-phase coil and a W-phase coil. First motor generator 110 generates power from mechanical power, which is generated by engine 100 and split by power split device 130. The electric power generated by first motor generator 110 is used in accordance with the running state of the vehicle and the state of charge of battery 150. For example, during normal running, the electric power generated by first motor generator 110 is used directly as electric power for driving second motor generator 120. On the other hand, when the SOC of battery 150 is lower than a predetermined value, the electric power generated by first motor generator 110 is converted from alternating-current power to direct-current power by an inverter described later. Then, the electric power is adjusted in voltage by a converter described later and stored in battery 150.

When first motor generator 110 acts as a power generator, first motor generator 110 generates a negative torque. The negative torque as used herein refers to a torque that will serve as a load on engine 100. When first motor generator 110 acts as a motor with electric power being supplied from first motor generator 110, first motor generator 110 generates a positive torque. The positive torque as used herein refers to a torque that will not serve as a load on engine 100, i.e., a torque that will assist the rotation of engine 100. The same applies to second motor generator 120.

Second motor generator 120 is a three-phase alternating-current rotating electric machine including a U-phase coil, a V-phase coil and a W-phase coil. Second motor generator 120 is driven by at least one of the electric power stored in battery 150 and the electric power generated by first motor generator 110.

Driving force from second motor generator 120 is transmitted to front wheels 160 via reduction gear 140. Second motor generator 120 thus assists engine 100, and causes the vehicle to run by the driving force from second motor generator 120. Rear wheels may be driven instead of or in addition to front wheels 160.

During regenerative braking of the hybrid vehicle, second motor generator 120 is driven by front wheels 160 via reduction gear 140, and second motor generator 120 operates as a power generator. Second motor generator 120 thus operates as a regenerative brake for converting braking energy into electric power. The electric power generated by second motor generator 120 is stored in battery 150.

Power split device 130 is formed of a planetary gear including a sun gear, a pinion gear, a carrier, and a ring gear. The pinion gear engages with the sun gear and the ring gear. The carrier supports the pinion gear in such a manner that allows rotation of the pinion gear. The sun gear is coupled to a rotating shaft of first motor generator 110. The carrier is coupled to the crankshaft of engine 100. The ring gear is coupled to a rotating shaft of second motor generator 120 and reduction gear 140.

Battery stack 150 serves as a battery set having a configuration in which a plurality of battery modules, each having a plurality of battery cells integrated with each other, are connected in series. Battery 150 has a voltage of about 200 V, for example. Battery 150 is charged with the electric power supplied from first motor generator 110 and second motor generator 120, as well as from a power supply outside the vehicle. A capacitor may be used instead of or in addition to battery 150.

Charge electric power of battery 150 is restricted to be equal to or lower than an upper limit value determined in accordance with the temperature of battery 150. The upper limit value is calculated from a map having temperatures of battery 150 as a parameter. The temperature of battery 150 is detected by a temperature sensor 152, and a signal indicating the temperature is input to ECU 170.

The hybrid vehicle further incorporates a navigation system 180. A user can register a destination and a departure time into navigation system 180. A destination and a departure time may also be registered into navigation system 180 from outside the vehicle, through the use of a personal digital assistant such as a mobile phone, a smartphone, or the like. Additionally, various other items of information are stored in navigation system 180, including a gradient of a road surface, an altitude, a length of a road, and driving conditions at various points in the past (such as a vehicle speed, an acceleration, a deceleration, a steering angle, charge/discharge electric power of battery 150, etc.).

Figure 2:
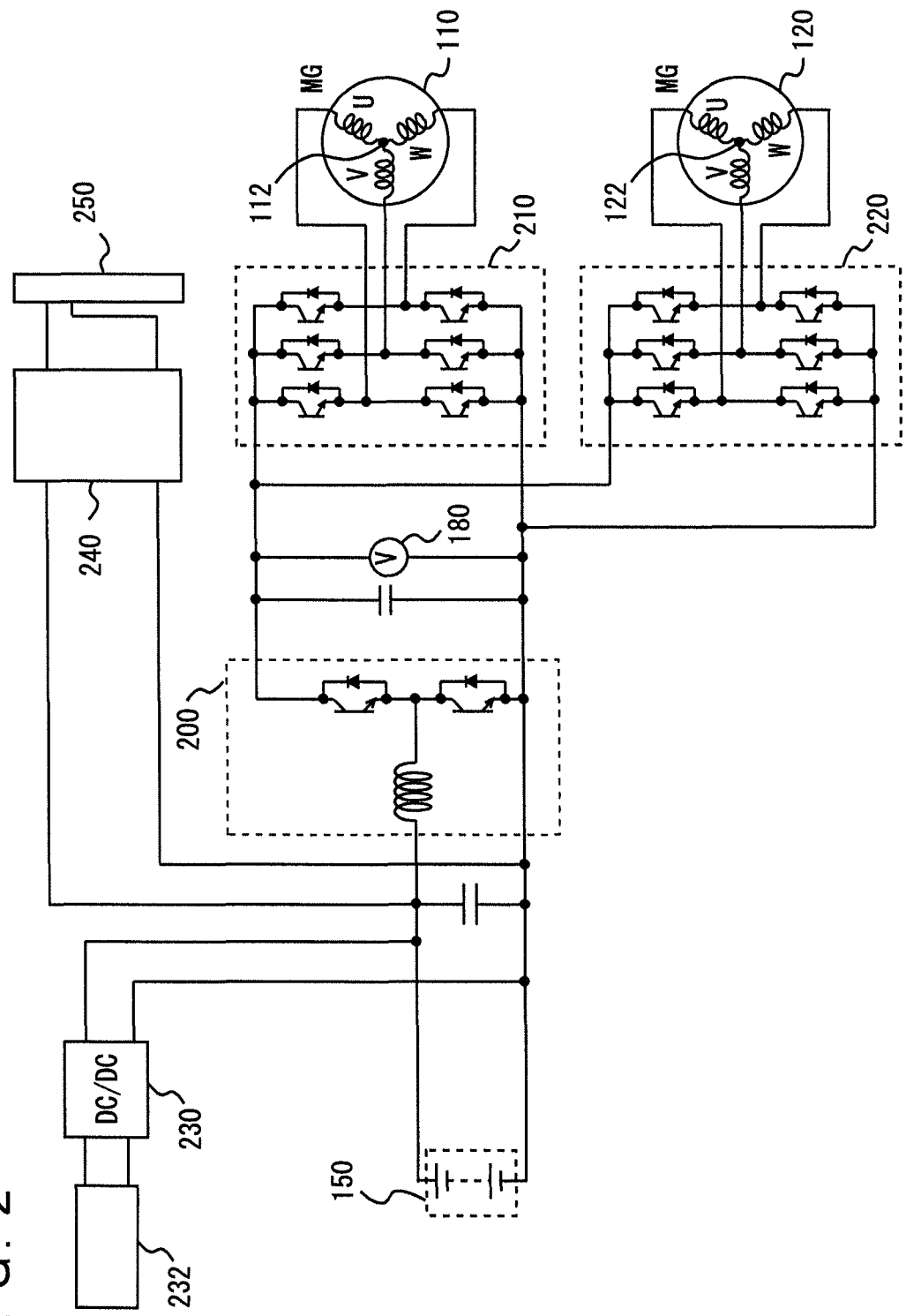
FIG. 2 is a (first) diagram showing an electric system.

Referring to FIG. 2, the electric system of the hybrid vehicle will be further described. The hybrid vehicle is provided with a converter 200, a first inverter 210, a second inverter 220, a DC/DC converter 230, a charger 240, and an inlet 250. Converter 200, first inverter 210, second inverter 220, DC/DC converter 230, and charger 240 are controlled by ECU 170.

When electric power discharged from battery 150 is supplied to first motor generator 110 or second motor generator 120, converter 200 boosts the voltage. Conversely, when electric power generated by first motor generator 110 or second motor generator 120 is charged into battery 150, converter 200 lowers the voltage.

First inverter 210 converts a direct current supplied from battery 150 into an alternating current for supply to first motor generator 110. First inverter 210 also converts an alternating current generated by first motor generator 110 into a direct current.

Second inverter 220 converts a direct current supplied from battery 150 into an alternating current for supply to second motor generator 120. Second inverter 220 also converts an alternating current generated by second motor generator 120 into a direct current.

DC/DC converter 230 is connected in parallel with converter 200 between battery 150 and converter 200. DC/DC converter 230 lowers the direct-current voltage. Electric power output from DC/DC converter 230 is supplied to an auxiliary battery 232, ECU 170, air-fuel ratio sensor 104, heaters 106, 108, and the like.

Figure 3:
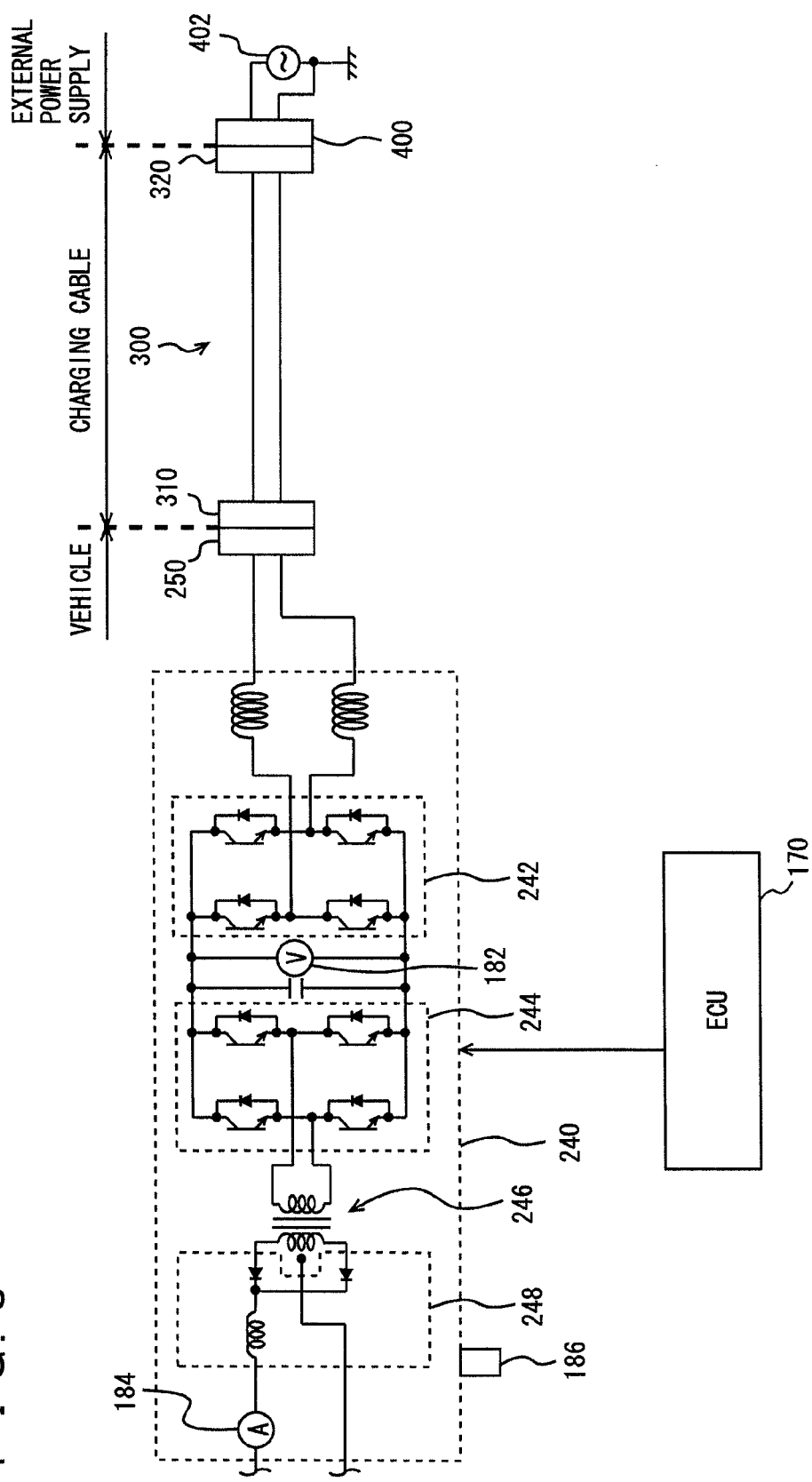
FIG. 3 is a (second) diagram showing an electric system.

Charger 240 is connected between battery 150 and converter 200. As shown in FIG. 3, charger 240 includes an AC/DC conversion circuit 242, a DC/AC conversion circuit 244, an insulation transformer 246, and a rectifier circuit 248.

AC/DC conversion circuit 242 is formed of a single-phase bridge circuit. AC/DC conversion circuit 242 converts alternating-current power into direct-current power based on a driving signal from ECU 170. AC/DC conversion circuit 242 also serves as a boost chopper circuit that boosts the voltage by using the coils as the reactor.

DC/AC conversion circuit 244 is formed of a single-phase bridge circuit. DC/AC conversion circuit 244 converts direct-current power into high frequency alternating-current power for output to insulation transformer 246, based on a driving signal from ECU 170.

Insulation transformer 246 includes a core made of a magnetic material, and a primary coil and a secondary coil wound around the coil. The primary coil and secondary coil are electrically insulated from each other, and connected to DC/AC conversion circuit 244 and rectifier circuit 248, respectively. Insulation transformer 246 converts the high frequency alternating-current power received from DC/AC conversion circuit 244 to assume a voltage level in accordance with a turns ratio of the primary coil and the secondary coil for output to rectifier circuit 248. Rectifier circuit 248 rectifies the alternating-current power output from insulation transformer 246 into direct-current power.

A voltage between AC/DC conversion circuit 242 and DC/AC conversion circuit 244 (a voltage across terminals of a smoothing capacitor) is detected by a voltage sensor 182, and a signal indicating the detection result is input to ECU 170. An output current from charger 240 is detected by a current sensor 184, and a signal indicating the detection result is input to ECU 170. Further, a temperature of charger 240 is detected by a temperature sensor 186, and a signal indicating the detection result is input to ECU 170.

Inlet 250 is provided on a side face of the hybrid vehicle, for example. A connector 310 of a charging cable 300 coupling the hybrid vehicle and an external power supply 402 is connected to inlet 250.

A plug 320 of charging cable 300 is connected to an outlet 400 provided at a house. Alternating-current power is supplied to outlet 400 from external power supply 402 of the hybrid vehicle. The electric power supplied from external power supply 402 is charged into battery 150, with the hybrid vehicle and external power supply 402 being coupled to each other through charging cable 300.

In the present embodiment, the electric power supplied from external power supply 402 is used for warming up battery 150 or engine 100, in addition to charging of battery 150. By way of example, ECU 170 causes at least one of the engine-related components and battery 150 to be heated, using the electric power supplied from outside while the electric power is being supplied from outside, in accordance with a distance over which the vehicle can run by driving second motor generator 120 alone (this distance will hereinafter also be denoted as the EV (Electric Vehicle) running range) and a distance to a destination from a present location or a departure point of the vehicle.

Figure 4:
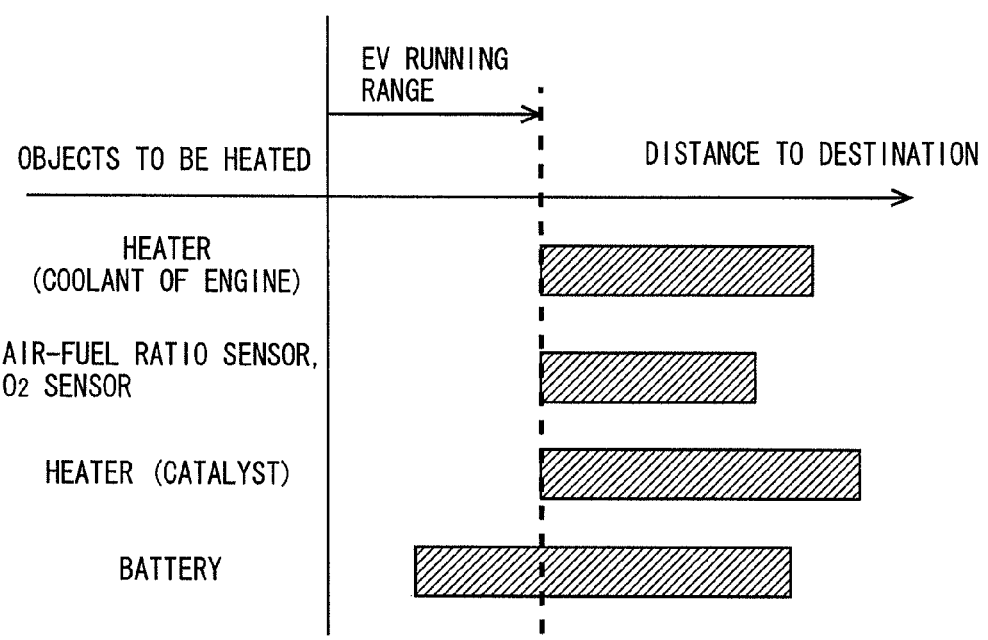
FIG. 4 is a diagram showing objects to be warmed up in advance, in accordance with a distance to a destination.

More specifically, as indicated by the oblique lines in FIG. 4, if the distance to the destination is longer than the EV running range, the engine-related components and battery 150 are heated, using the electric power supplied from outside while the electric power is being supplied from outside. With respect to the engine-related components, determination as to whether heating is to be performed or not may be made for each component. For example, determination as to whether heating is to be performed or not may be made separately for heater 106, i.e., the coolant of engine 100, and air-fuel ratio sensor 104.

If the distance to the destination is shorter than the EV running range, battery 150 only is heated, using the electric power supplied from outside while the electric power is being supplied from outside. The engine-related components are not heated.

ECU 170 further determines whether the engine-related components or battery 150 are/is to be heated or not in accordance with a running pattern to the destination, in addition to the EV running range and the distance to the destination.

By way of example, ECU 170 determines, from the running pattern to the destination, whether or not warm-up of engine 100 is completed with heat generated from engine 100 before arrival at the destination, without heating the engine-related components. If the distance to the destination is longer than EV running range, and the warm-up of engine 100 is not completed before arrival at the destination, the engine-related components are heated, using the electric power supplied from outside while the electric power is being supplied from outside.

Likewise, ECU 170 determines, from the running pattern to the destination, whether or not warm-up of battery 150 is completed with heat generated from battery 150 before arrival at the destination, without heating battery 150. If the distance to the destination is longer than the EV running range, and the warm-up of battery 150 is not completed before arrival at the destination, battery 150 is heated, using the electric power supplied from outside while the electric power is being supplied from outside.

ECU 170 also determines whether battery 150 is to be heated or not in accordance with electric power consumed for heating battery 150 and an amount of increase in regenerative electric power obtained by heating battery 150, in addition to the EV running range and the distance to the destination.

By way of example, if the distance to the destination is shorter than the EV running range, and the amount of increase in regenerative electric power is greater than the electric power consumed for heating, battery 150 is heated, using the electric power supplied from outside while the electric power is being supplied from outside.

The EV running range is calculated from, for example, a map having states of charge of battery 150 as a parameter. If battery 150 is charged until a departure time input by the user, the EV running range may be calculated based on a predicted state of charge of battery 150 at the departure time. Since a generally used technique may be suitably utilized as a method for calculating the EV running range, further description will not be repeated herein.

The distance to the destination from the present location or the departure point of the vehicle is calculated by navigation system 180. Since a generally used technique may be suitably utilized as a method for calculating the distance to the destination from the present location or the departure point of the vehicle, further description will not be repeated herein.

Air-fuel ratio sensor 104 and $O_2$ sensor are heated by application of electricity. The coolant of engine 100 is heated by heating heater 106. Catalyst 102 is heated by heating heater 108.

Heating of battery 150 is realized by discharge of battery 150, for example. As an example, by controlling second inverter 220 such that a current flows only through the U-phase coil and the V-phase coil of second motor generator 120, electric power is discharged from battery 150, and battery 150 itself generates heat due to internal resistance of battery 150. Battery 150 is then charged again until the state of charge reaches a desired value (for example, 100%).

The running pattern to the destination includes various items of information including a gradient of a road surface to the destination, an altitude, driving conditions in the past (such as a vehicle speed, an acceleration, a deceleration, a steering angle, charge/discharge electric power of battery 150, etc.). Running power of the vehicle is predicted based on these items of information. A time at which the predicted running power becomes equal to or greater than the above-described engine starting threshold value, i.e., a time at which engine 100 is operated, is predicted. Transition of the temperature of the coolant of engine 100 is predicted based on the time at which engine 100 is operated and the predicted running power. When the time at which the predicted temperature of the coolant becomes equal to or higher than a threshold value is earlier than a predicted time of arrival at the destination, it is determined that warm-up of engine 100 is completed with the heat generated from engine 100 before arrival at the destination. The method for determining whether or not the warm-up of engine 100 is completed with the heat generated from engine 100 before arrival at the destination is not limited to that described herein.

Furthermore, discharge electric power of battery 150 and a discharge time are predicted from the various items of information including a gradient of a road surface to the destination, an altitude, driving conditions in the past (such as a vehicle speed, an acceleration, a deceleration, a steering angle, charge/discharge electric power of battery 150, etc.) Transition of the temperature of battery 150 is predicted based on the predicted discharge electric power and discharge time. When the time at which the predicted temperature of battery 150 becomes equal to or higher than a threshold value is earlier than the predicted time of arrival at the destination, it is determined that warm-up of battery 150 is completed with the heat generated from battery 150. The method for determining whether or not the warm-up of battery 150 is completed with the heat generated from battery 150 before arrival at the destination is not limited to that described herein.

The electric power consumed for heating battery 150 is calculated based on a map predetermined by the engineer and having temperatures of battery 150 detected by temperature sensor 152 as a parameter. The method for calculating the electric power consumed for heating battery 150 is not limited to that described herein.

The amount of increase in regenerative electric power obtained by heating battery 150 corresponds to a difference between regenerative electric power after heating battery 150 and regenerative electric power before heating battery 150. Regenerative electric power is predicted from an upper limit value of the charge electric power of battery 150 and the information including a gradient of a road surface to the destination, an altitude, driving conditions in the past, etc.

Thus, the regenerative electric power after heating battery 150 is predicted from the upper limit value of the charge electric power after heating battery 150 and the information including a gradient of a road surface to the destination, an altitude, driving conditions in the past, etc.

Likewise, the regenerative electric power before heating battery 150 is predicted from the upper limit value of the charge electric power before heating battery 150 and the information including a gradient of a road surface to the destination, an altitude, driving conditions in the past, etc.

As described above, the upper limit value of the charge/discharge electric power is determined in accordance with the temperature of battery 150. Thus, the upper limit value of the charge electric power after heating battery 150 is determined in accordance with the predicted temperature of battery 150 after heating. Instead of predicting the temperature, a predetermined constant temperature may be used. The upper limit value of the charge electric power before heating battery 150 is determined in accordance with a temperature of battery 150 before heating, which is detected by temperature sensor 152.

Figure 5:
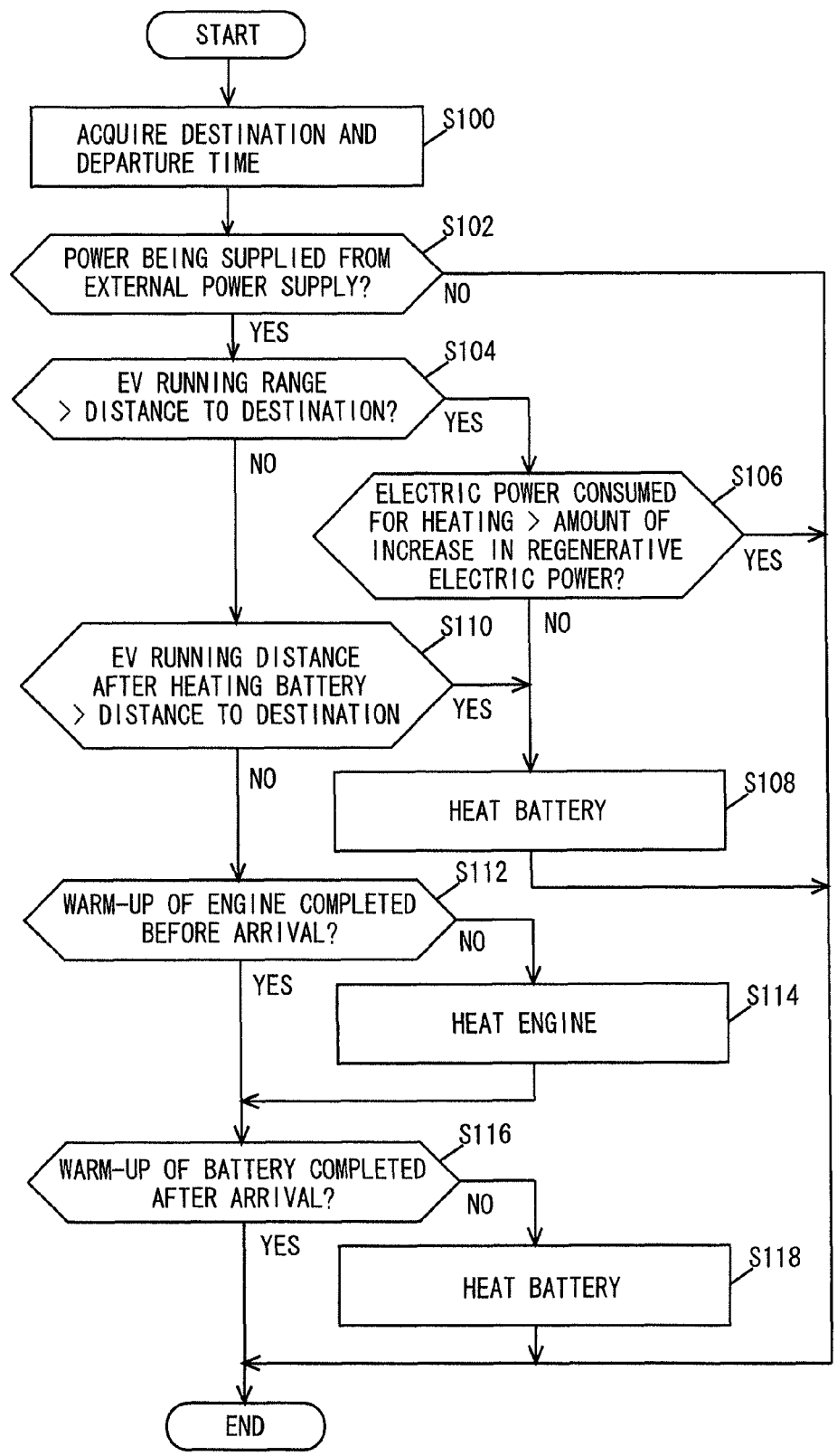
FIG. 5 is a flowchart showing processing executed by an ECU.

Referring to FIG. 5, processing executed by ECU 170 is described. The processing described below may be executed by hardware, software, or cooperation between hardware and software.

In step ("step" will hereinafter be abbreviated to S) 100, a destination and a departure time are acquired. In S102, it is determined whether electric power is being supplied from external power supply 402 or not. For example, if a voltage detected by voltage sensor 182 is equal to or higher than a threshold value, it is determined that electric power is being supplied from external power supply 402. If electric power is being supplied from external power supply 402 (YES in S102), it is determined in S104 whether a distance to the destination is shorter than the EV running range or not.

If the distance to the destination is shorter than the EV running range (YES in S104), it is determined whether or not electric power consumed for heating battery 150 is greater than an amount of increase in regenerative electric power obtained by heating battery 150.

If the electric power consumed for heating is greater than the amount of increase in regenerative electric power (NO in S106), battery 150 is heated in S108, using the electric power supplied from outside while the electric power is being supplied from outside. That is, battery 150 is warmed up in advance before departure.

On the other hand, if the distance to the destination is longer than the EV running range (NO in S104), it is determined in S110 whether or not the distance to the destination will become shorter than the EV running range by heating battery 150. That is, it is determined whether the EV running range will be extended by heating battery 150 or not. Whether the EV running range will be extended or not is predicted, by way of example, from the upper limit value of the charge electric power at a predicted temperature (for example, a prescribed temperature) of battery 150 after heating, and from the information including a gradient of a road surface to the destination, an altitude, driving conditions in the past, etc. If regenerative electric power is increased, it is determined that the EV running range will be extended. An extended distance of the EV running range is predicted from the amount of increase in regenerative electric power.

If the distance to the destination will become shorter than the EV running range by heating battery 150 (YES in S110), battery 150 is heated in S108, using the electric power supplied from outside while the electric power is being supplied from outside. That is, battery 150 is warmed up in advance before departure.

If the distance to the destination will be longer than the EV running range even if battery 150 is heated (NO in S110), it is determined in S112 whether or not warm-up of engine 100 is completed with the heat generated from engine 100 before arrival at the destination, without heating the engine-related components. If the warm-up of engine 100 is not completed before arrival at the destination (NO in S112), the engine-related components are heated in S114, using the electric power supplied from outside while the electric power is being supplied from outside. That is, the engine-related components are warmed up in advance before departure.

Furthermore, it is determined in S116 whether or not warm-up of battery 150 is completed with the heat generated from battery 150 before arrival at the destination, without warming up battery 150. If the warm-up of battery 150 is not completed before arrival at the destination (NO in S116), battery 150 is heated in S118, using the electric power supplied from outside while the electric power is being supplied from outside. That is, battery 150 is warmed up in advance before departure.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100: engine; 102: catalyst; 104: air-fuel ratio sensor; 106, 108: heater; 110: first motor generator; 120: second motor generator; 130: power split device; 140: reduction gear; 150:

battery; 152: temperature sensor; 160: front wheel; 170: ECU; 180: navigation system; 182: voltage sensor: 184: current sensor; 186: temperature sensor; 200: converter; 210: first inverter; 220: second inverter; 230: DC/DC converter; 232: auxiliary battery; 240: charger; 242: AC/DC conversion circuit; 244: DC/AC conversion circuit; 246: insulation transformer; 248: rectifier circuit; 250: inlet; 300: charging cable; 310: connector; 320: plug; 400: outlet; 402: external power supply.

The invention claimed is:

1. An apparatus for controlling a vehicle having an engine to which an engine-related component is attached, a power storage device adapted to be charged with electric power supplied from outside, and an electric motor as a driving source to which electric power is supplied from said power storage device, comprising
a control unit that causes at least one of said engine-related component and said power storage device to be heated, using the electric power supplied from outside while the electric power is being supplied from outside, in accordance with a distance over which said vehicle can run by driving said electric motor alone and a distance to a destination,
said control unit determining, with respect to said engine-related component and said power storage device, whether heating is to be performed or not in accordance with a running pattern to the destination, in addition to the distance over which said vehicle can run by driving said electric motor alone and the distance to the destination.

2. The apparatus for controlling the vehicle according to claim 1, wherein
said control unit determines, from the running pattern to the destination, whether or not warm-up of said engine is completed with heat generated from said engine before arrival at the destination, and if the warm-up of said engine is not completed before arrival at the destination, said control unit causes said engine-related component to be heated, using the electric power supplied from outside while the electric power is being supplied from outside.

3. The apparatus for controlling the vehicle according to claim 1, wherein
said control unit determines, from the running pattern to the destination, whether or not warm-up of said power storage device is completed with heat generated from said power storage device before arrival at the destination, and if the warm-up of said power storage device is not completed before arrival at the destination, said control unit causes said power storage device to be heated, using the electric power supplied from outside while the electric power is being supplied from outside.

4. An apparatus for controlling a vehicle having an engine to which an engine-related component is attached, a power storage device adapted to be charged with electric power supplied from outside, and an electric motor as a driving source to which electric power is supplied from said power storage device, comprising
a control unit that causes at least one of said engine-related component and said power storage device to be heated, using the electric power supplied from outside while the electric power is being supplied from outside, in accordance with a distance over which said vehicle can run by driving said electric motor alone and a distance to a destination,
said control unit determining whether said power storage device is to be heated or not in accordance with electric power consumed for heating said power storage device and an amount of increase in regenerative electric power obtained by heating said power storage device, in addition to the distance over which said vehicle can run by driving said electric motor alone and the distance to the destination.

5. The apparatus for controlling the vehicle according to claim 4, wherein
said control unit causes said power storage device to be heated, using the electric power supplied from outside while the electric power is being supplied from outside, if the amount of increase in regenerative electric power is greater than the electric power consumed for heating.

6. A method for controlling a vehicle having an engine to which an engine-related component is attached, a power storage device adapted to be charged with electric power supplied from outside, and an electric motor as a driving source to which electric power is supplied from said power storage device, comprising the steps of:
comparing a distance over which said vehicle can run by driving said electric motor alone and a distance to a destination; and
heating at least one of said engine-related component and said power storage device, using the electric power supplied from outside while the electric power is being supplied from outside, in accordance with a running pattern to the destination, in addition to the distance over which said vehicle can run by driving said electric motor alone and the distance to the destination.

7. A method for controlling a vehicle having an engine to which an engine-related component is attached, a power storage device adapted to be charged with electric power supplied from outside, and an electric motor as a driving source to which electric power is supplied from said power storage device, comprising the steps of:
comparing a distance over which said vehicle can run by driving said electric motor alone and a distance to a destination; and
heating at least one of said engine-related component and said power storage device, using the electric power supplied from outside while the electric power is being supplied from outside, in accordance with electric power consumed for heating said power storage device and an amount of increase in regenerative electric power obtained by heating said power storage device, in addition to the distance over which said vehicle can run by driving said electric motor alone and the distance to the destination.

8. The apparatus for controlling the vehicle according to claim 1, wherein
said control unit causes said engine-related component to be heated, using the electric power supplied from outside while the electric power is being supplied from outside, if the distance to the destination is longer than the distance over which said vehicle can run by driving said electric motor alone.

9. The apparatus for controlling the vehicle according to claim 1, wherein
said control unit causes said power storage device to be heated, using the electric power supplied from outside while the electric power is being supplied from outside, if the distance to the destination is shorter than the distance over which said vehicle can run by driving said electric motor alone.

10. The apparatus for controlling the vehicle according to claim 4, wherein said control unit causes said engine-related component to be heated, using the electric power supplied from outside while the electric power is being supplied from outside, if the distance to the destination is longer than the distance over which said vehicle can run by driving said electric motor alone.

11. The apparatus for controlling the vehicle according to claim 4, wherein said control unit causes said power storage device to be heated, using the electric power supplied from outside while the electric power is being supplied from outside, if the distance to the destination is shorter than the distance over which said vehicle can run by driving said electric motor alone.

* * * * *